US012038833B2

(12) United States Patent
Karl

(10) Patent No.: US 12,038,833 B2
(45) Date of Patent: Jul. 16, 2024

(54) TEST AND VALIDATION OF PRIVACY PROTECTION QUALITY OF ANONYMIZATION SOLUTIONS

(71) Applicant: The Toronto-Dominion Bank, Toronto (CA)

(72) Inventor: Moshe Karl, Petah Tikva (IL)

(73) Assignee: The Toronto-Dominion Bank, Toronto (CA)

( * ) Notice: Subject to any disclaimer, the term of this patent is extended or adjusted under 35 U.S.C. 154(b) by 165 days.

(21) Appl. No.: 17/533,841

(22) Filed: Nov. 23, 2021

(65) Prior Publication Data
US 2023/0161695 A1    May 25, 2023

(51) Int. Cl.
G06F 11/36    (2006.01)
G06F 21/62    (2013.01)

(52) U.S. Cl.
CPC ...... *G06F 11/3696* (2013.01); *G06F 11/3684* (2013.01); *G06F 11/3688* (2013.01); *G06F 11/3692* (2013.01); *G06F 21/6254* (2013.01)

(58) Field of Classification Search
CPC ............. G06F 11/3692; G06F 11/3688; G06F 11/3696; G06F 11/3684; G06F 21/6254
See application file for complete search history.

(56) References Cited

U.S. PATENT DOCUMENTS

| 8,316,054 B2 | 11/2012 | El Emam et al. |
| 8,990,252 B2 | 3/2015 | Bezzi |
| 9,460,311 B2 | 10/2016 | Bezzi et al. |

(Continued)

FOREIGN PATENT DOCUMENTS

| JP | 6833613 B2 | 2/2021 |
| WO | 2019/098136 A1 | 5/2019 |

OTHER PUBLICATIONS

Zhang et al.; "Investigating Visual Analysis of Differentially Private Data"; IEEE Transactions on Visualization and Computer Graphics; vol. 27, No. 2, pp. 1786-1796; Feb. 2021; https://people.cs.umas.edu/~miklau/assets/pubs/viz/zhang20investigating.pdf.

(Continued)

*Primary Examiner* — Wei Y Zhen
*Assistant Examiner* — Brahim Bourzik
(74) *Attorney, Agent, or Firm* — CPST Intellectual Property Inc.; Brett J. Slaney

(57) ABSTRACT

A testing system, tool and method for determining anonymization process quality are disclosed. The testing tool includes a processor, a communications module coupled to the processor, and a memory coupled to the processor. The memory stores computer executable instructions that when executed by the processor cause the processor to obtain a first dataset comprising data to be anonymized. The processor obtains a second dataset comprising data resulting from the first dataset being subjected to an anonymization process by a testing platform to anonymize a portion of the first dataset and generates a visual representation of the first dataset. The processor generates a second visual representation of the second dataset, the second visual representation reflecting at least in part a transformation from the first dataset to the second dataset. The processor generates an output including the first and second visual representations, the output being illustrative of the transformation.

20 Claims, 13 Drawing Sheets

(56) References Cited

U.S. PATENT DOCUMENTS

| | | | |
|---|---|---|---|
| 9,697,381 B2 | 7/2017 | Shen et al. | |
| 9,910,957 B2 | 3/2018 | Obrien et al. | |
| 10,719,627 B2* | 7/2020 | Maier | G06N 20/00 |
| 10,915,662 B2 | 2/2021 | Gkoulalas-Divanis | |
| 10,936,744 B1* | 3/2021 | Trepetin | G06F 21/6254 |
| 10,977,389 B2 | 4/2021 | Margalit et al. | |
| 11,003,795 B2 | 5/2021 | Gkoulalas-Divanis | |
| 2007/0239705 A1* | 10/2007 | Hunt | G06F 21/6254 |
| | | | 707/999.005 |
| 2013/0282679 A1* | 10/2013 | Khin | G06F 16/258 |
| | | | 707/698 |
| 2014/0143239 A1* | 5/2014 | Fu | G06F 16/24578 |
| | | | 707/723 |
| 2014/0201847 A1 | 7/2014 | Ito et al. | |
| 2015/0007249 A1* | 1/2015 | Bezzi | H04W 12/02 |
| | | | 726/1 |
| 2019/0251290 A1* | 8/2019 | Maier | G06N 20/00 |
| 2019/0303614 A1* | 10/2019 | Do | G06F 3/0604 |
| 2019/0309620 A1* | 10/2019 | Hoeink | G06F 21/6254 |
| 2020/0210458 A1 | 7/2020 | Dang et al. | |
| 2020/0327252 A1 | 10/2020 | McFall et al. | |
| 2021/0117573 A1* | 4/2021 | Lewbel | G06F 21/6254 |
| 2022/0237332 A1* | 7/2022 | Emmert | G06F 21/74 |

OTHER PUBLICATIONS

Avraam et al.; "Privacy preserving data visualizations"; EPJ Data Sci. (2021);10: 02; pp. 1-34; Jan. 7, 2021; https://doi.org/10.1140/epjds/s13688-020-00257-4.

* cited by examiner

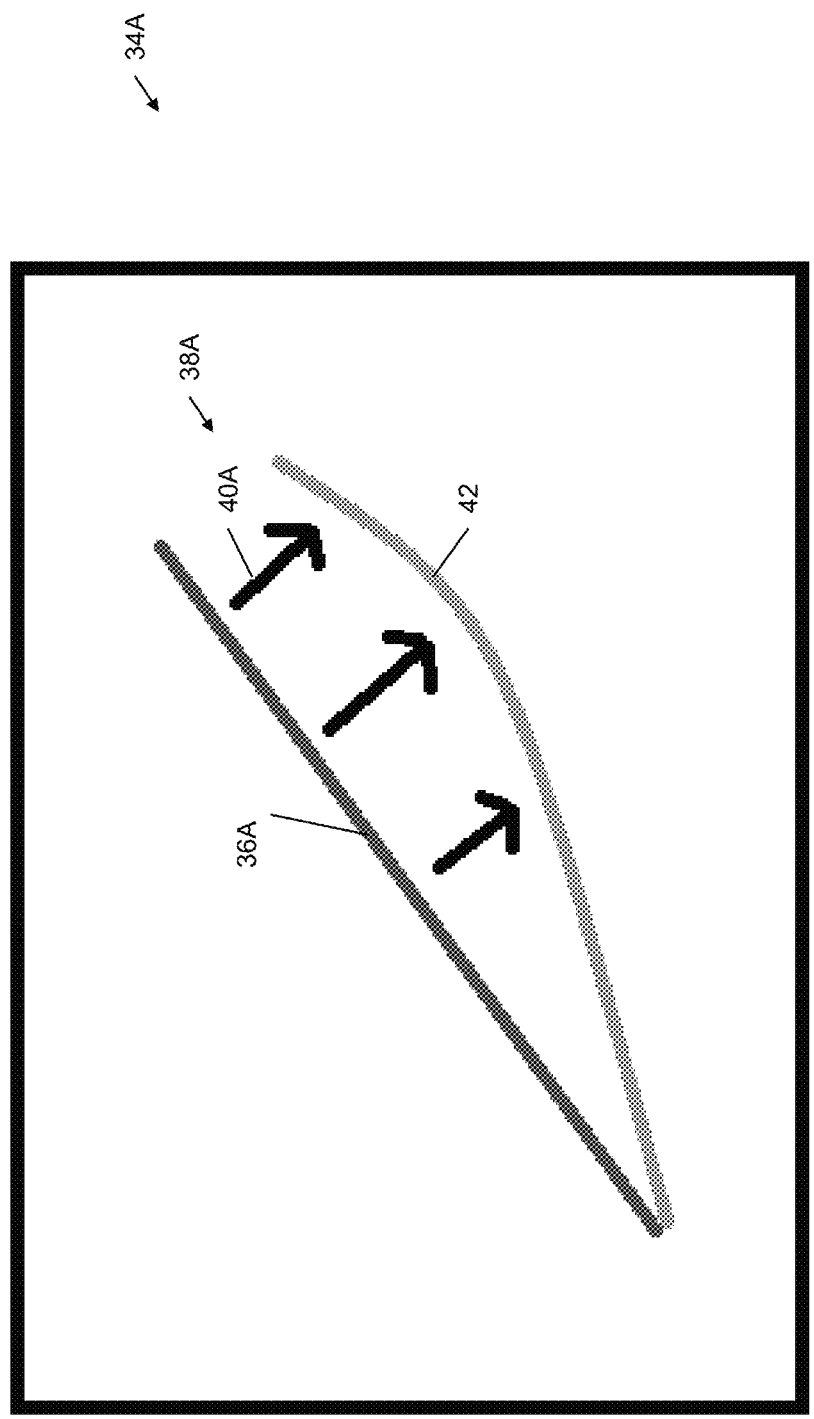

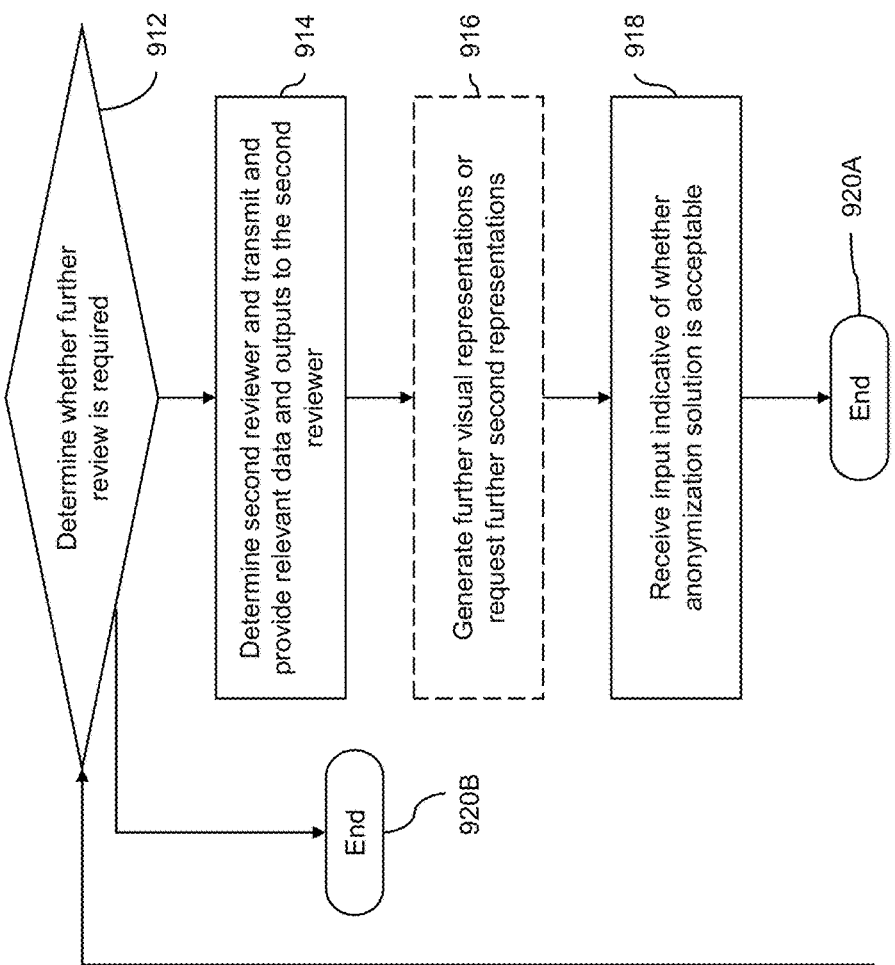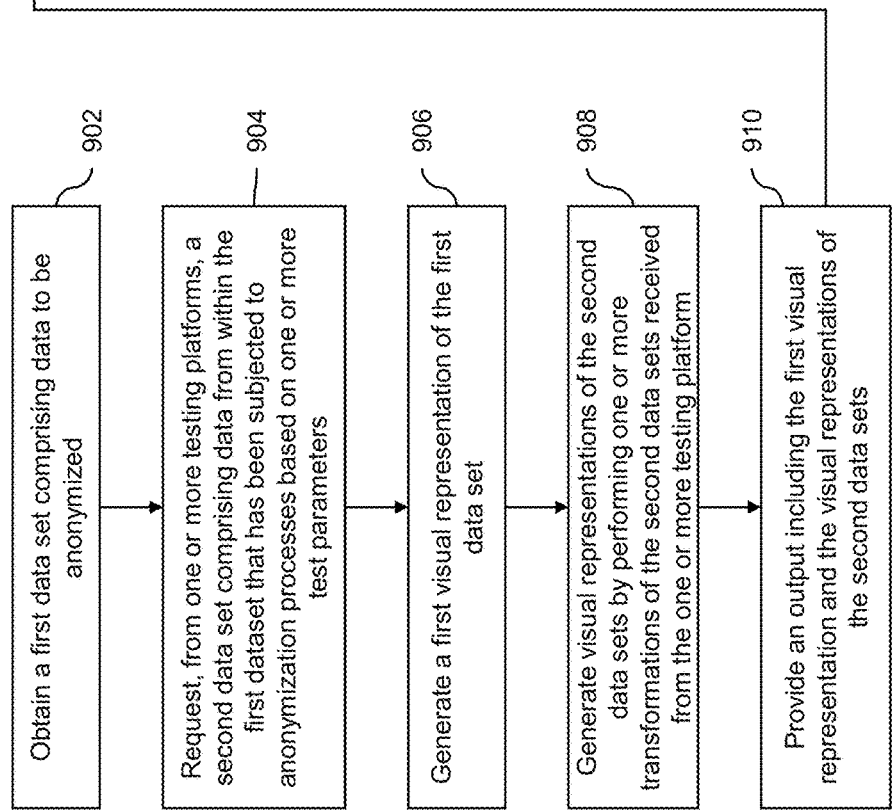
FIG. 9

TEST AND VALIDATION OF PRIVACY PROTECTION QUALITY OF ANONYMIZATION SOLUTIONS

TECHNICAL FIELD

The following relates generally to a testing tool for determining anonymization solution quality in a computing environment.

BACKGROUND

The rise in remote working arrangements within enterprises has exposed an increasing amount of sensitive data to risks associated with computing environments. At the same time, the increased digitization of private life and private communications has also exposed an increasing amount of personal data to similar risks. One approach to addressing the increased risk includes anonymizing data with anonymization solutions to avoid intentional or inadvertent disclosure of sensitive data.

There is a need for testing the anonymization solutions. Existing approaches to testing anonymization solutions can be complicated and may require highly specialized training or personnel. Existing anonymization solution testing can be time or computing resource intensive and may lack a means of efficiently or effectively focusing these resources. Moreover, testing regimes may need to be alert to the possibility that anonymization solutions can be designed to favorably navigate anonymization solution testing without additional substantive performance improvements. Furthermore, anonymization solution testing can be difficult to implement since interacting with the data at issue is often counterintuitive, and simple, efficient, scalable, reproducible, or quick interactions with the data can be difficult.

Improvements to testing anonymization solutions which can or may address limitations to existing solutions are desirable.

BRIEF DESCRIPTION OF THE DRAWINGS

Embodiments will now be described with reference to the appended drawings wherein:

FIG. 7A is an example visualization of two further datasets.

FIG. 9 is a flow diagram illustrating another example method for testing anonymization solutions.

DETAILED DESCRIPTION

Figure 1:
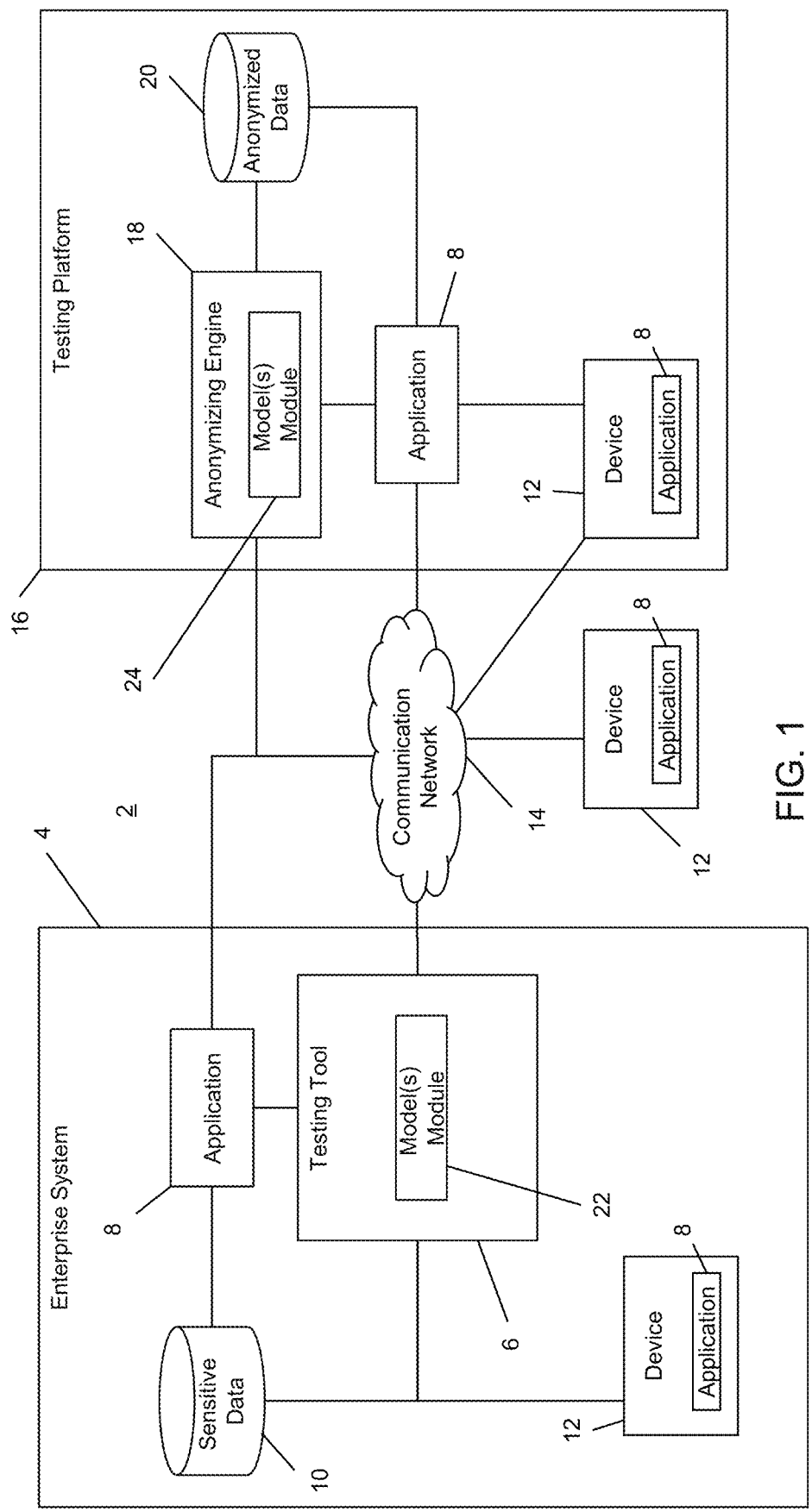
FIG. 1 is a schematic diagram of an example computing environment for testing anonymization solutions.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Hereinafter, the term anonymization solution, anonymization process, or similar terms such as data sanitation shall be used to describe a function or a process by which sensitive or personalized data is converted into, or intended to be converted into, data that directly or indirectly exposes less sensitive or personal data. To illustrate by way of example, whereas sensitive or personalized data can possibly be analyzed or reverse engineered to determine the identity of the person associated with the data, anonymized data is intended to be converted to sensitive or personalized data that still retains some interrelationships in the sensitive data to allow for its use (e.g., to show experimental results), while at the same time inhibiting identification of the person or entity associated with the sensitive or personalized data.

Hereinafter, the term data or data points may be used interchangeably to signify digital representations of various physical characteristics or abstract concepts. For example, data points may include data in a spreadsheet in a financial institution (e.g., a customer's age, a government-issued identification (ID), bank account information, login credentials, etc.), data used in, or gleaned from, experimentation (e.g., the results of a pharmaceutical study, surveys, and so forth), data generated or compiled by a government agency or other quasigovernmental institution, and so forth. It is understood that the term data or data points is not intended to be limited to a particular size of a dataset, a type of data (e.g., numerical, or non-numerical), and so forth. In addition, the term "sensitive", in relation to data, may be used to describe data that is generated, stored, or received by a person or enterprise with the intention to at least in part limit its disclosure. Sensitive data in this application denotes data that includes at least some sensitive data and can include data which is not sensitive. For example, sensitive data can include data which is intended to be circulated publicly at a later time (e.g., experiment results, which can include non-sensitive data such as methodology), data which is intended to be circulated in a limited manner (e.g., loan data, which may also be shared with a regulator), or data not intended to be circulated (e.g., trade secrets).

Various tools exist which offer to anonymize data exist. One category of existing anonymization solutions is known as "masking" or differential privacy solutions. These solutions can apply well-understood approaches to the data as part of the anonymization process. For structured data, for example, these approaches can apply on a per field basis, potentially implementing different operations to different fields within the dataset. In some instances, masking approaches can result in the datasets which remain largely unchanged except for a select set of sensitive fields. For example, in a "name" field, the datapoint may be changed from "Joe" into "Jane", in a number field the datapoint may change from the number 13 into a range (10,20), and so forth.

Masking a dataset may render it irrelevant or undesirable for use, depending on the use case. Another disadvantage to masking is that the clear relationships between the original data and the anonymized data may increase its potential susceptibility to privacy threats such as reverse engineering.

Another category of anonymization solutions, often referred to as "non-masking," attempts to anonymize data on a more aggregate level as compared to transforming each field separately. One non-masking approach could be to "shuffle" the dataset into a new dataset. The shuffling can be equivalent to generating a new so called "synthetic" dataset that maintains some similarities to the sensitive data. Synthetic datasets may remove sufficient information from the sensitive data such that no clear relationship between the sensitive data and the synthetic dataset is readily apparent. The sensitive data values can be retained independent of the synthetic dataset, preserving flexibility for future use.

The disadvantage of non-masking solutions is that can be hard to describe and analyze how effective these solutions are in protecting sensitive data. While evaluating or guaranteeing non-masking approaches' ability to protect sensitive data is difficult, failing to identify flawed anonymization solutions not only represents a disclosure risk, but may cause irreversible reputational or other types of damage.

This application discloses a method, tool, and system (hereinafter discussed with reference only to a tool for simplicity) for testing anonymization solutions, and in an advantageous implementation evaluating anonymization solutions which employ non-masking schemes to sanitize data. The disclosed tool can generate visualizations which allow for different layers of assessment of various anonymization solutions, where the layers can differ in their use of specialized staff and resources. For example, in a first round of assessment, the disclosed tool can generate visualizations of a dataset to be sanitized, and a visualization of the sanitized data resulting from the first dataset (1) being anonymized by a testing platform, and (2) reflecting at least in part a transformation from the first dataset to the second dataset. The transformations facilitate comparison between the visual representations of the datasets. For example, the visualization of the second dataset can include a visual indicator indicating that there is a topological equivalence between the two datasets (i.e., the dataset to be sanitized and the sanitized dataset). In an advantageous implementation, the visualizations are overlapped or superimposed on one another, and the transformation facilitates the aforementioned superimposing. For example, the transformation can shift the second dataset into a range which facilitates superimposition of the two datasets.

The disclosed tool can test various testing platforms to assess a degree of similarity between the dataset sent to the testing platform and the received sanitized dataset. The degree of similarity can be determined, for example, by the testing tool (1) performing a regression (e.g., a linear regression such as a least squares regression, nonlinear regressions) to the second dataset, and (2) determining whether the regression satisfies criteria associated with a degree of similarity, such as a maximum number of outliers, maximum residual(s), etc.

The degree of similarity can include multiple criteria that can be evaluated at various instances in time. For example, notwithstanding that a second dataset is found not to have topological equivalence to the first dataset, the second dataset can be found to fail a first threshold related to a degree of similarity. The testing tool can thereafter transmit the sanitized data to a less specialized reviewer of first instance to ensure the received dataset clears a lower threshold before escalation to a more specialized reviewer.

In at least one example embodiment, the testing tool can initiate a second round of review by transmitting the assessment materials (i.e., the datasets and visualizations) to a more specialized reviewer. The further round of review can be initiated by the anonymized dataset failing the aforementioned threshold of similarity or based on a first reviewer's rejection of the proposed solution. In this way, the testing tool can possibly streamline operations such that testing platforms which do not provide the requisite degree of anonymity are discarded without needing review from the more expensive or more limited availability or access to a specialized reviewer.

The testing tool can generate different visual representations with different transformations to assess the anonymization solution. The tool can allow for reviewers of different skill sets to interact with the data underlying the assessment in an intuitive manner. For example, in an advantageous embodiment, the disclosed testing tool can allow a reviewer (e.g., a more advanced reviewer) to generate quick and efficient variant visual representations. The reviewer can avail themselves of different transformations to generate various variant visual representations of the datasets to facilitate comparison and different types of analysis. Moreover, the reviewer can generate variant visual representations of subsets of the datasets at issue, affording the reviewer various review perspectives which can be generated to support different depths of inquiry. For example, in example embodiments, testing platforms can be tested with subsets of data intended to be anonymized to determine whether the testing platform passes an initial operating criterion.

In some example embodiments, some of the rounds of review are automated and focus on quantitative analysis of the anonymization solutions. The visualizations can facilitate qualitative evaluation of the anonymization solutions, and there can be synergies in using both types of evaluation to perform a holistic evaluation.

In one aspect, a testing system, tool and method for determining anonymization process quality are disclosed. The testing tool includes a processor, a communications module coupled to the processor, and a memory coupled to the processor. The memory stores computer executable instructions that when executed by the processor cause the processor to obtain a first dataset comprising data to be anonymized. The processor obtains a second dataset comprising data resulting from the first dataset being subjected to an anonymization process by a testing platform to anonymize a portion of the first dataset and generates a visual representation of the first dataset. The processor generates a second visual representation of the second dataset, the second visual representation reflecting at least in part a transformation from the first dataset to the second dataset. The processor generates an output including the first and second visual representations, the output being illustrative of the transformation.

In example embodiments, transformation is a topological transformation.

In example embodiments, the computer executable instructions further cause the processor to transmit to the testing platform, via the communications module, the first dataset and one or more testing parameters, the second dataset resulting from the first dataset being subjected to the anonymization process based on the one or more testing parameters by the testing platform.

In example embodiments, the computer executable instructions further cause the processor to request, from a second testing platform, a third dataset generated by subjecting the first dataset to an anonymization process associated with the second testing platform. The processor generates a third visual representation based on the third dataset, and the output includes at least one of the third dataset and the third visual representation.

In example embodiments, the testing tool requests the second dataset and the third dataset based on one or more testing parameters, or the testing tool requests the third dataset based on one or more additional testing parameters different from the one or more testing parameters.

In example embodiments, the computer executable instructions further cause the processor to obtain the first dataset by retrieving the first dataset from a deployment environment. The processor obtains a fourth dataset from a deployment environment, the fourth dataset comprising at least a portion of anonymized data of the first dataset. The processor compares the second dataset to the fourth dataset retrieved from the deployment environment and generates a fourth visual representation associated with the comparison. The output includes the fourth visual representation.

In example embodiments, the computer executable instructions further cause the processor to provide at least one of the second dataset, the first dataset or the output to a development environment, a testing environment, or both, for real time analysis.

In example embodiments, the computer executable instructions further cause the processor to compare the second dataset to the first dataset by applying at least one threshold associated with a degree of similarity between datasets. In response to determining the comparison fails the at least one threshold, the processor generates a warning and the output includes the warning.

In example embodiments, the first visual representation represents a subset of the first dataset, and the second dataset comprises data resulting from subjecting the first dataset to the anonymization process.

In example embodiments, the computer executable instructions further cause the processor to generate a further visual representation of the second dataset different from the second visualization. The further visual representation reflects at least in part a second transformation from the first dataset to the second dataset. The output includes the further visual representation.

In example embodiments, the computer executable instructions further cause the processor to receive input from a reviewer annotating the output and transmit the annotated output to a subsequent reviewer.

In a further aspect, a method of determining anonymization system quality is disclosed. The method, executed by a device having a communications module, includes obtaining, via the communications module, a first dataset comprising data to be anonymized, and obtaining, via the communications module, a second dataset comprising data resulting from the first dataset being subjected to an anonymization process by a testing platform to anonymize at least a portion of the first dataset. The method includes generating a first visual representation of the first dataset, and generating a second visual representation of the second dataset, the second visual representation reflecting at least in part a transformation from the first dataset to the second dataset. The method includes generating an output including the first and second visual representations, the output being illustrative of the transformation.

In example embodiments, the transformation is a topological transformation.

In example embodiments, the method includes transmitting to the testing platform, via the communications module, the first dataset and one or more testing parameters. The second dataset results from the first dataset being subjected to the anonymization process based on the one or more testing parameters by the testing platform In example embodiments, the method includes requesting, from a second testing platform, a third dataset generated by subjecting the first dataset to an anonymization process associated with the second testing platform. The method can include generating a third visual representation based on the third dataset and the output includes at least one of the third dataset and the third visual representation.

In example embodiments, the method includes comparing the second dataset to the first dataset by applying at least one threshold associated with a degree of similarity between datasets. In response to determining the comparison fails the at least one threshold, the method includes generate a warning, and the output includes the warning.

In example embodiments, the first visual representation represents a subset of the first dataset, and the second dataset comprises data resulting from subjecting the first dataset to the anonymization process.

In example embodiments, the method includes generating a further visual representation of the second dataset different from the second visualization, the further visual representation reflecting at least in part a second transformation from the first dataset to the second dataset. The output includes the further visual representation.

In example embodiments, the method includes receiving input from a reviewer annotating the output, and transmitting the annotated output to a subsequent reviewer.

In yet another aspect, a non-transitory computer readable medium for determining anonymization system quality is disclosed. The computer readable medium includes computer executable instructions for obtaining, via the communications module, a first dataset comprising data to be anonymized, and obtaining, via the communications module, a second dataset comprising data resulting from the first dataset being subjected to an anonymization process by a testing platform to anonymize at least a portion of the first dataset. The computer executable instructions are for generating a first visual representation of the first dataset, and generating a second visual representation of the second dataset, the second visual representation reflecting at least in part a transformation from the first dataset to the second dataset. The computer executable instructions are for generating an output including the first and second visual representations, the output being illustrative of the transformation.

Referring now to the figures, in FIG. 1 a schematic diagram of an example system for testing anonymization solutions in a computing environment 2 is shown. In the shown aspect, the computing environment 2 includes an enterprise system 4 hosting a testing tool 6, an instance of an application 8, and a database 10. Although shown within a single enterprise system 4, the testing tool 6, the application 8, and the database 10 can be located in separate systems (e.g., the testing tool 6 can be hosted in a cloud computing environment, and the database 10 can be hosted locally within enterprise system 4), in a system other than an enterprise system 4 (e.g., in a personal computing system, or computing system of a non-profit organization, etc.), or can be hosted on different devices within the same enterprise system 4 while communicating with one another as further described herein.

The enterprise system 4 can be associated with a financial institution system (e.g., a commercial bank) that provides financial services to users or enterprises and provides access to employees to perform banking related functions. For example, the banking related functions can include accessing customer data to provide customer service options. In another nonlimiting example, the banking related functions can include employees accessing internal financial data or customer data for the purposes of marketing, projections, or internal operational consulting.

The testing tool 6 transforms data to facilitate a comparison between the sensitive data (hereinafter referred to as dataset D1) and anonymized data (hereinafter referred to as dataset D2). For example, the testing tool 6 can apply a topographical transformation to dataset D2 and use the topographically transformed dataset (hereinafter referred to as dataset D3) to facilitate comparison with the dataset D1. The testing tool 6 can apply several different types or amounts of transformations to a dataset. For example, the testing tool 6 can apply various transformations in sequence to a particular dataset.

Similarly, the testing tool 6 can generate various visual representations of a particular dataset. The testing tool 6 can generate visual representations of a subset of the particular dataset, visual representations associated with different transformations applied to the particular dataset, and so forth. For example, the testing tool 6 can generate a scatterplot or bar graph or pie chart of two-dimensional data (e.g., wealth and income) to visualize interrelationships within the dataset. The testing tool 6 can generate various visual representations, including bar graphs, scatterplots, line graphs, pie charts, histograms, and so forth.

As will be described herein, the testing tool 6 can preprocess data to generate the data to be sent to a testing platform 16 (e.g., dataset D1). The preprocessing completed by the testing tool 6 can be completed according to model(s) stored within the model module 22 (hereinafter referred to simply as module 22 for ease of reference).

The testing tool 6 can preprocess data to generate a dataset D1 which is a subset of the data intended to be anonymized or preprocess data to combine data from different data sources. For example, the testing tool 6 can transmit a dataset D1 which includes partial data from a first dataset, partial data from the dataset D2, and so forth.

In example embodiments, the testing tool 6 can at least partially anonymize data (e.g., data stored on the database 10) to generate the dataset D1 to avoid possible disclosure of highly sensitive information. For example, the testing tool 6 can remove family and middle names, and truncate first names to first initials. In at least some example embodiments, the testing tool 6 can preprocess or manipulate data into various types of datasets D1 that have various types and amounts of sensitive data, which data can exhibit various differing interrelationships, with the intention of evaluating the performance of the testing platform 16 in response to the specific composition of the dataset D1. For example, the testing tool 6 can preprocess data to include various types of sensitive data, such as data including a name, address, security questions, etc. to determine how the testing platform 16 processes the types of data (e.g., strings, numbers, etc.).

In another illustrative example, the testing tool 6 can preprocess data to generate dataset D1 to test increasingly difficult use cases. For example, the testing tool 6 can send data which includes only ten columns, and if the testing platform 16 satisfies performance based on the initially transmitted dataset D1, the testing tool 6 can send a subsequent dataset D1 which includes information with twenty columns. In at least one embodiment, the dataset D1 is at least in part generated by the testing tool 6 (i.e., a fictitious dataset) and does not include verbatim sensitive or personal data.

The testing tool 6 can complete the preprocessing according to model(s) stored within the module 22. The models can implement machine learning, modeling, pattern matching, or other automated techniques to generate the respective dataset. The models can be machine learning models, which are iteratively trained with example or training data to learn specific parameters which increase the likelihood that the model will output a result identified as a truth when processing the training data.

To facilitate comparison, the preprocessing by testing tool 6 can also be force a common reference onto two different visual representations or two different datasets. For example, where the testing tool 6 receives a first dataset (dataset D1) with income values between $40,000 and $100,000, and a second dataset (dataset D2) with income values between $20,000 and $40,000, and $80,000 and hundred and $80,000, the testing tool 6 can determine the common reference range to be $20,000 to $200,000. Determining or forcing the common reference onto the two different visual representations allows for generating overlapping visual representations of the datasets, allowing for easier visual representation. Determining or forcing the common reference onto the two different visual representations can allow for easier side by side or adjacent viewing.

The testing tool 6 can also be configured to force onto or generate a common notation for two different datasets. For example, where the income data in the dataset D1 is in the format of a currency, and the income data in another dataset (e.g., another dataset D1, or the dataset D2) is in the format of a number with four decimal points, the testing tool 6 can edit the formatting of all datasets to coincide or be normalized with a particular dataset D1. In example embodiments, the testing tool 6 creates a new dataset instance and enforces a consistent notation within the dataset while retrieving data from the existing datasets.

The application 8 can be used to provide access to or control access to enterprise resources of the enterprise system 4 by the testing tool 6. For example, the application 8 or a subfunction of the application 8, or different instances of the application 8 can be associated with a department, line of business, service or other entity or sub-entity within or associated with the enterprise system 4. Each instance of the application 8 can control access to the database 10 or the testing tool 6 for its associated user. For example, the application 8 can be used to permit access by the testing tool 6 to the database 10 for the user of device 12. In another example, the application 8 can be used to edit or update or otherwise manipulate data within the database 10 used by the testing tool 6. Each system interacting with or seeking access to the testing tool 6 can be required to run an instance of application 8 (e.g., as shown in anonymization system in FIG. 1) to interact with testing tool 6. The application 8 can be used to generate a graphical user interface for controlling or otherwise interacting with the testing tool 6. Although not shown, the application 8 can incorporate the testing tool 6, for example where the testing tool 6 is sold via an application marketplace.

The testing tool 6 includes or otherwise has access to sensitive data in the database 10 and/or can provide a cache for same. The sensitive data within the database 10 can be related to various types of information or content, such as customer data, employee or stakeholder data, conversation transcripts (e.g., transcripts from call center interactions), metadata, tags, notes, files (e.g., PDFs, spreadsheets, text documents), links (e.g., uniform resource locators (URLs)), images, videos, etc. The data can be data specific to the enterprise system 4, or data that is created from or otherwise related to interactions between entities within the computing environment 2. An example of customer of employee data can include data associated with a user of a device 12 that interacts with the enterprise system 4 or application 8 (e.g., for participating in mobile banking and using customer service channels associated with such banking, or for performing employment related tasks), transaction history data that is captured and provided with a transaction entry (e.g., data captured by a graphical user interface of a document management system, or a mobile or web-based banking application, or a retail payment processor). In at least one embodiment, data stored within database 10 can be mapped or otherwise associated with other data or profiles (e.g., an employee profile) within database 10. For example, client profile data that can be mapped to corresponding financial data for that user and/or can include some of the financial data. The data associated with a client or employee can include, without limitation, demographic data (e.g., age, gender, income, location, etc.), preference data input by the client, financial data, and inferred data generated through machine learning, modeling, pattern matching, or other automated techniques. The client or employee profile data can also include historical interactions and transactions associated with the enterprise system 4, e.g., login history, search history, communication logs, etc.

Entities within the computing environment 2 can communicate with one another via communication network 14. Communication network 14 can include a telephone network, wired, wireless, cellular, and/or data communication network to connect the enterprise system 4 with the testing platform 16, or devices 12, or to connect resources hosted within the enterprise system 4, or the testing platform 16, or devices 12, each other, or to other devices. For example, the communication network 14 can include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The shown computing environment 2 also includes the testing platform 16, which hosts an anonymizing engine 18, an instance of the application 8, and a database 20. The testing platform 16 can be a system or an instance of a computer program created by third party such as a service provider to a commercial bank. The testing platform 16 can include at least in part a computer product program intended to anonymize sensitive data provided to the testing platform 16.

The anonymizing engine 18 anonymizes sensitive data by receiving or retrieving the dataset D1 from the testing tool 6 and anonymizes same. In example embodiments, the anonymizing engine 18 communicates directly or indirectly with the database 10 of the enterprise system 4 after being granted access to the database 10 to receive the dataset D1. In at least some example embodiments, the testing platform 16 receives the dataset D1 through a physical medium, such as a user transferring the dataset D1 to the testing platform 16 via a universal serial bus (USB) device.

The anonymizing engine 18 can anonymize the dataset D1 with the aid of one or more models within the model module 24. The models can implement machine learning, modeling, functions (e.g., mapping, randomizing, etc.), pattern matching, or other automated techniques to generate the respective dataset. The models can be machine learning models, which are iteratively trained with example or training data to learn specific parameters which increase the likelihood that the model will output a result identified as a truth when processing the training data.

The database 20 can store dataset D2, the dataset D1, any parameters or routines associated with anonymizing the dataset D1, settings (e.g., security settings, operational parameters, and so forth), and so forth.

In example embodiments, the components of the testing platform 16 and the enterprise system 4 are hosted within the same system (e.g., the enterprise system 4 includes the testing platform 16). In at least some example embodiments, some components of the testing platform 16 are hosted within the enterprise system 4. For example, the database 20 can be a separate instance of the database 10 and hosted within the enterprise system 4, which can allow the enterprise to exert greater control over data flow.

In at least some example embodiments, some, or all the functionality of the testing platform 16 or the enterprise system 4 can be accessed or controlled via a device 12 associated with one or more users. Users can be suppliers of anonymizing solutions, contracted program testing providers, reviewers, employees, customers, or clients (e.g., to allow the entering of information to be anonymized), correspondents, agents, employees, or other entities that interact with the enterprise system 4 and/or testing platform 16, directly or indirectly. The computing environment 2 can include multiple devices 12, each device 12 being associated with a separate user or associated with one or more users. In certain embodiments, a user can operate device 12 such that device 12 performs one or more processes consistent with the disclosed embodiments. For example, a contracted tester can use device 12 to engage and interface with a mobile or web-based system to interact with or otherwise manipulate either the testing tool 6 or the testing platform 16. The device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and can be operable to transmit and receive data across communication network 14.

The testing platform 16 and/or enterprise system 4 can also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the testing platform 16 and the enterprise system 4. The cryptographic server can be used to further protect sensitive data (e.g., financial data) and/or data stored on database 10 and/or models 22, 24, by way of encryption for data protection, digital signatures or message digests for data integrity, and by using digital certificates to authenticate the identity of the respective system users or devices 12 with which the enterprise system 4 and/or the testing platform 16 communicates to inhibit data breaches by adversaries. It can be appreciated that various cryptographic mechanisms and protocols can be chosen and implemented to suit the constraints and requirements of the deployment of the testing platform 16 or enterprise system 4 as is known in the art.

The integrated testing tool 6 as described herein can speed up workflows as a result of integrating the testing tool 6, the testing platform 16, and the reviewer (if any) device 12. The workflows may be managed and decision-making possibly centralized, promoting ease of use and clear delineations of responsibility. In example embodiments, for example, incorporating a solution from the testing platform 16 into the existing deployment environment 4C is increased as development and/or evaluation of the testing tool 6, and the testing platform 16 can be more easily performed, and the testing can be quickly evaluated by individuals responsible for managing the separate systems. Or, a comparison between the candidate solution and the deployed solution can be performed faster as a result of the integration. In example embodiments, the integration facilitated comparison may be particularly useful in the event of a security breach within enterprise system 4 to quick compare alternative anonymization solutions.

Figure 2:
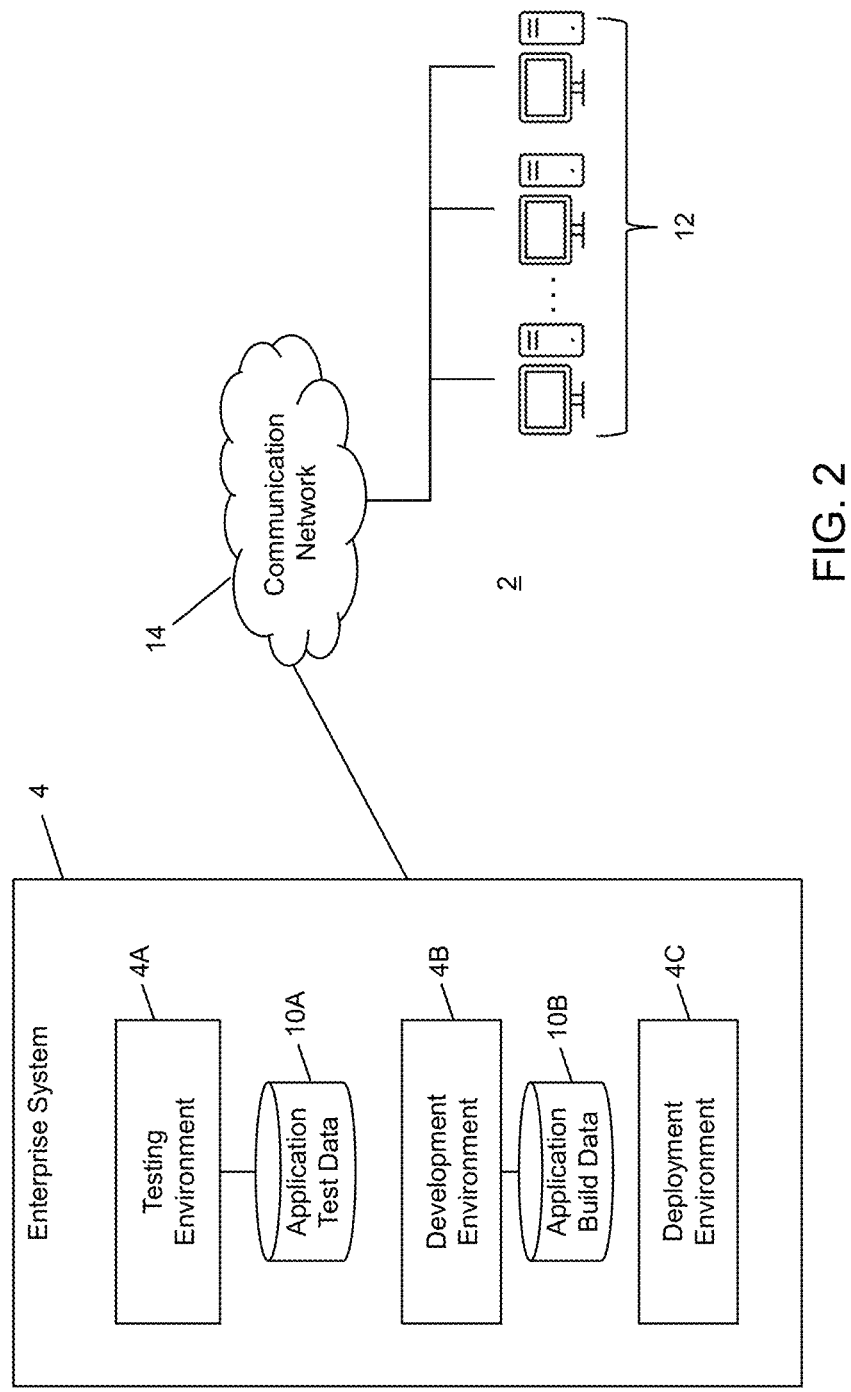
FIG. 2 is a block diagram of an example configuration of an enterprise system.

Reference is now made to FIGS. 2 to 5, which are each a block diagram or schematic diagram of the example computing environment 2 or an example application or tool development environment showing aspects of incorporating, interacting, and developing the testing tool 6. As shown in FIG. 2, the enterprise system 4 can include a testing environment 4A, a development environment 4B, and a deployment environment 4C, for respectively assessing an anonymization solution performance, developing the testing tool 6, and implementing the testing tool 6 within a system such as the enterprise system 4. The term environment may refer to separate physical computing resource (e.g., a server), or separate computing resources (e.g., a virtual machine). Although each of the environments are shown within the enterprise system 4, it is understood that the environments can be posted or instantiated outside of an enterprise system 4 and within the computing environment 2.

Figure 3:
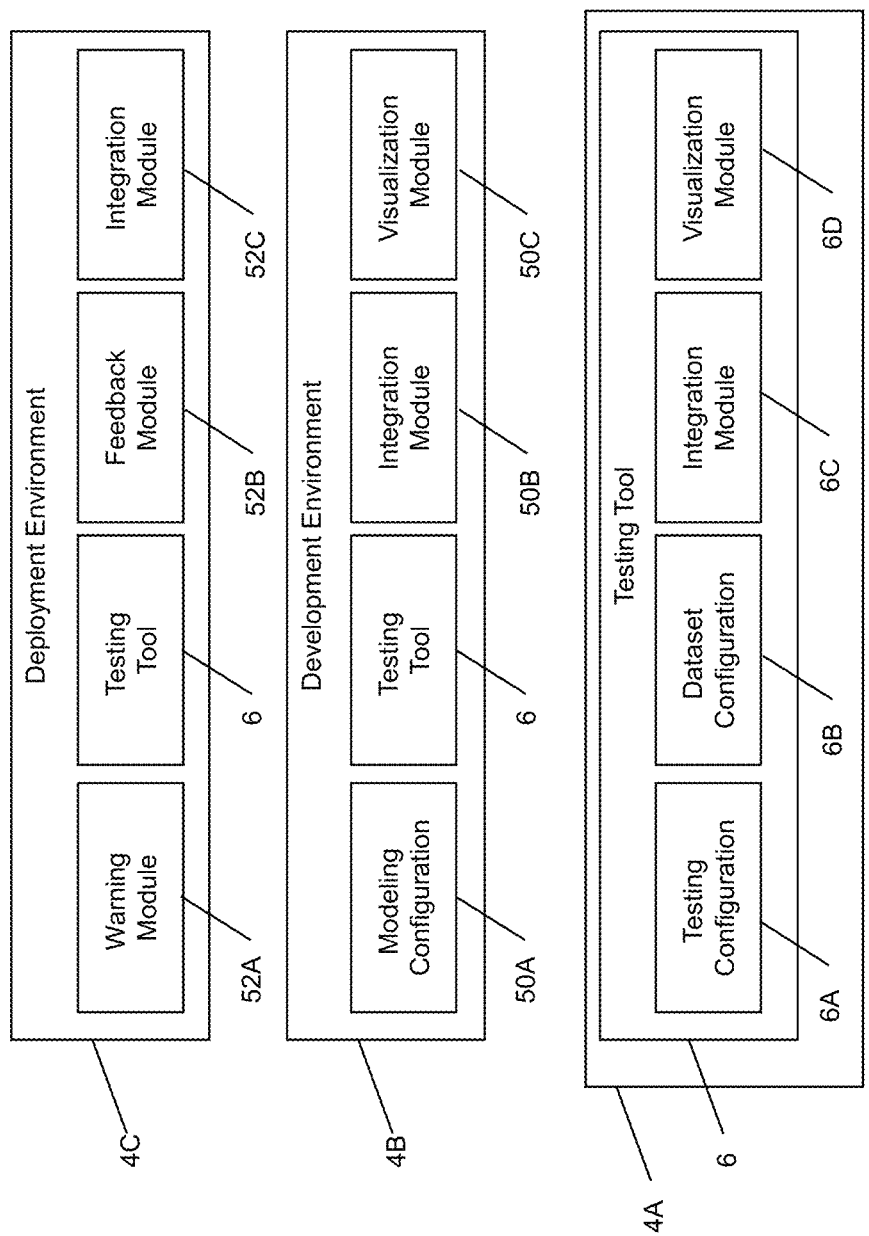
FIG. 3 is a schematic diagram of example environment associated with the testing tool.

Referring now to FIG. 3, the testing tool 6 can include a testing configuration module 6A which includes one or more testing parameters. The one or more testing parameters define or delineate the scope of the dataset D2 expected to be received from the testing platform 16. For example, the one or more testing parameters can specify that the dataset D2 must comply with certain size restrictions (e.g., a minimum or maximum compression ratio), formatting restrictions (e.g., an XML file, etc.), deadlines by which the dataset D1 must be anonymized (e.g., two weeks), and so forth. Various numbers and types of testing parameters can be selected and combined to assess the quality of the testing platform 16. For example, the testing parameters can specify that one testing platform 16 is expected to provide a dataset D2 that complies with a particular compression ratio, where the testing platform 16 being evaluated is known to struggle with the particular compression ratio.

Testing configuration module 6A can also include the one or more models of module 22, which when applied to a dataset D2, transform the data to facilitate comparison between dataset D1 and dataset D2. In example embodiments, the model assesses whether a topographical transformation from dataset D1 to dataset D2 is possible. The model can be employed by the testing tool 6 to perform a regression (e.g., a linear regression such as a least squares regression, nonlinear regressions, etc.) to the dataset D2, and determine whether the regression satisfies criteria associated with a degree of similarity, such as a maximum number of outliers, maximum residual(s), etc. The models can be updated over time in response to developments in the field, or in response to detecting or observing testing platforms 16 use of approaches to maximize testing tool assessment without increasing real world performance.

Dataset configuration module 6B can include parameters which specify the preprocessing performed by testing tool 6 to generate the dataset D1. Integration module 6C can facilitate integration between the testing tool 6 and various other computing environments or systems (e.g., device 12, or development environment 4B, etc.).

Visualization module 6D generates visual representations. The visualization module 6D can generate visual representations of datasets (e.g., a scatterplot of dataset D2), visual representations denoting whether successful transformations are possible (e.g., denoting whether topographical transformations are possible through the use of arrows or other visual aids), visual representations denoting other criteria being satisfied or failed (e.g., the one or more visual elements 40A), and visual representations related to reviewing the visual representations (e.g., navigation tools, annotation tools, and so forth).

The development environment 4B can integrate the testing tool 6 in addition to a modelling configuration routine 50A, an integration module 50B, and a visualization module 50C. The modelling configuration routine 50A can, similar to testing configuration module 6A, include various algorithms which are being tested to determine their ability to assess testing platform 16 performance. In example embodiments, the modelling configuration routine 50A can access, update, or otherwise manipulate the models stored in model 22. Integration module 50B can include application programming interfaces or other software or hardware products which allow the development environment 4B to integrate with other devices or systems within the computing environment 2. The visualization module 50C generates visual representations, such as graphical user interfaces (GUI), to aid the development process. In an illustrative example, the visualization module 50C can generate a GUI allowing a developer to select various aspects of the testing tool 6 to test (e.g., testing the models in the model configuration module 50A, or testing the ability of the integration module 50B to connect with the enterprise system 4, or application 8, etc.).

The deployment environment 4C can also integrate the testing tool 6 in addition to a warning module 52A, a feedback module 52B, and an integration module 52C. The warning module 52A can generate visual representations of a warning, or data to create the visual representations, or populate a warning within the testing tool 6 upon determining that an anonymization solution or process does not satisfy the required threshold. The feedback module 52B can collect or permit the collecting of submissions by users of (i) the testing tool 6, or (ii) the environments, or (iii) members of a community interested in development of the testing tool 6. For example, the feedback module 52B can generate a graphical user interface allowing reviewers to input comments indicating that recent performance by the anonymization system or process has deteriorated, has changed unexpectedly, and so forth. The integration module 52C can facilitate integration of the testing tool 6 into the deployment environment 4C. For example, where the testing tool 6 is an application, such as an application downloaded by a user from an application marketplace, and where the deployment environment is a local computing machine (e.g., device 12), the integration module 52C can facilitate integration of the application testing tool 6 into the device 12.

Figure 4:
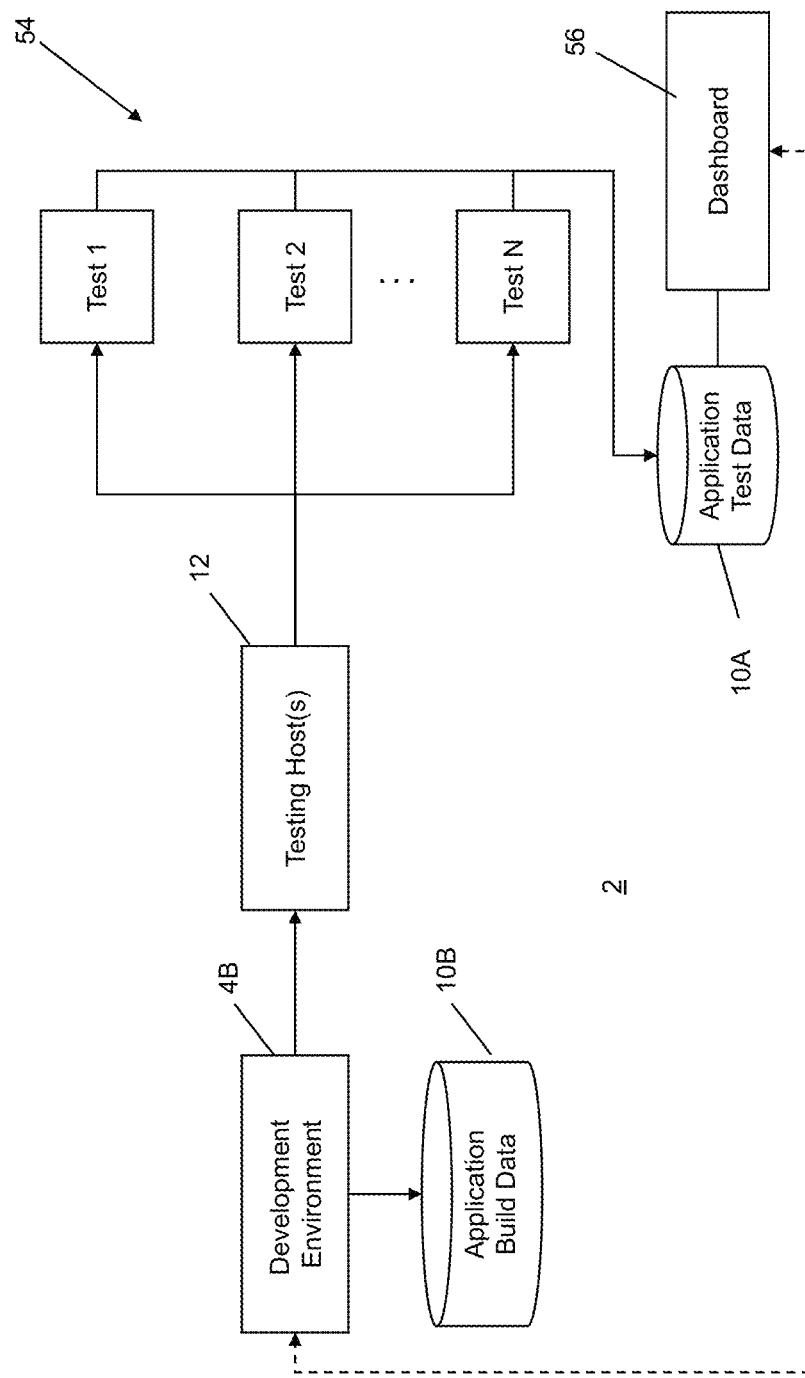
FIG. 4 is a block diagram of an example configuration of testing environment used to test a testing tool build.

Referring now to FIG. 4, a block diagram showing the example testing of the testing tool 6 is shown. In the shown example, the development environment 4B is instantiated by one or more devices 12 (shown denoted as the testing hosts). Various configurations of the testing tool 6, such as different modelling configurations present (which can be stored in database 10, or a subset thereof denoted by database 10B) in configuration module 50A are tested in tests 54. The outcomes of the tests 54 are deposited into a database (e.g., database 10, or a subset thereof denoted by database 10A). The outcomes can include metadata associated with the test such as the parameters used for testing, which testing platform 16 was tested, the composition of dataset D1, and so forth. The outcomes of the tests 54 can be visually represented and displayed on a dashboard 56 generated by the visualization module 50C of the development environment 4B. The testing 54 is used to determine shortcomings or performance of testing tool 6.

Figure 5:
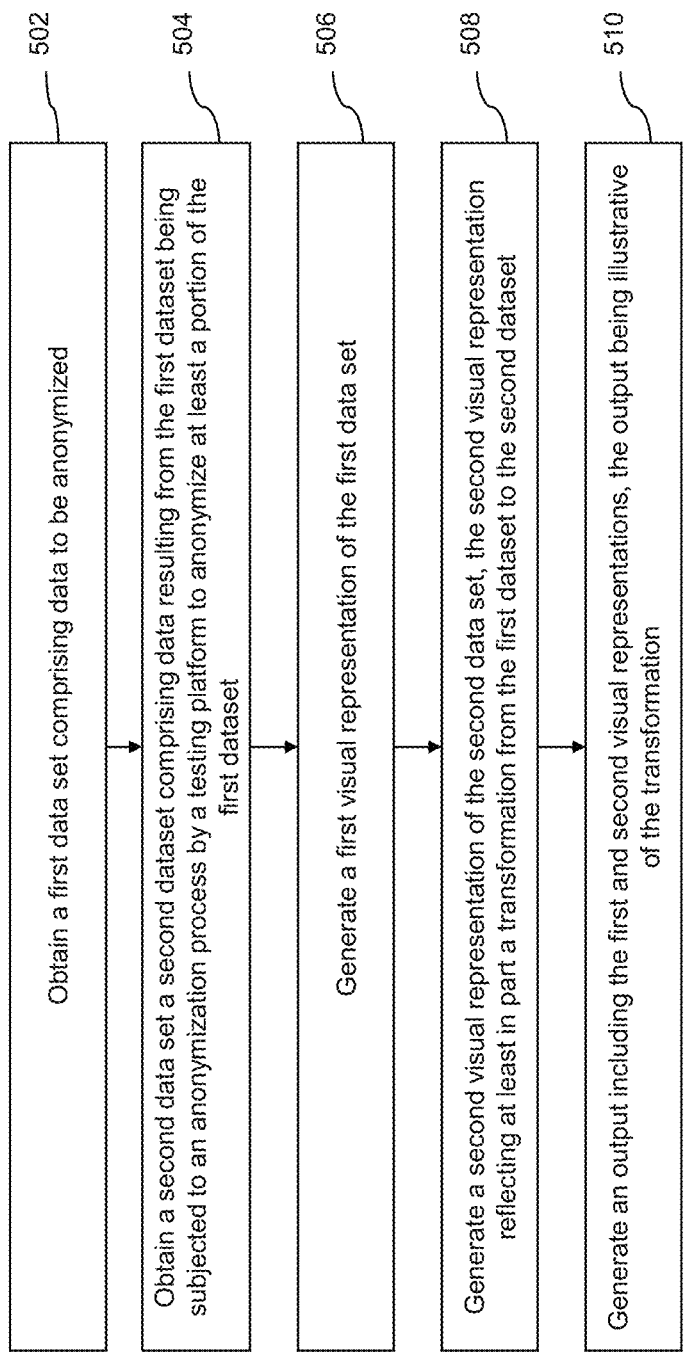
FIG. 5 is a flow diagram illustrating an example method for testing anonymization solutions.

Reference is now made to FIG. 5, which is a flow diagram of an example set of computer executable instructions for a testing tool for determining quality of anonymization systems. To provide illustrative context to the instructions described in FIG. 5, the blocks therein will be described with reference to the data distributions of FIGS. 6 to 8. It is understood that the disclosed method is not limited to the illustrative implementations described in the referred to figures.

Figure 6:
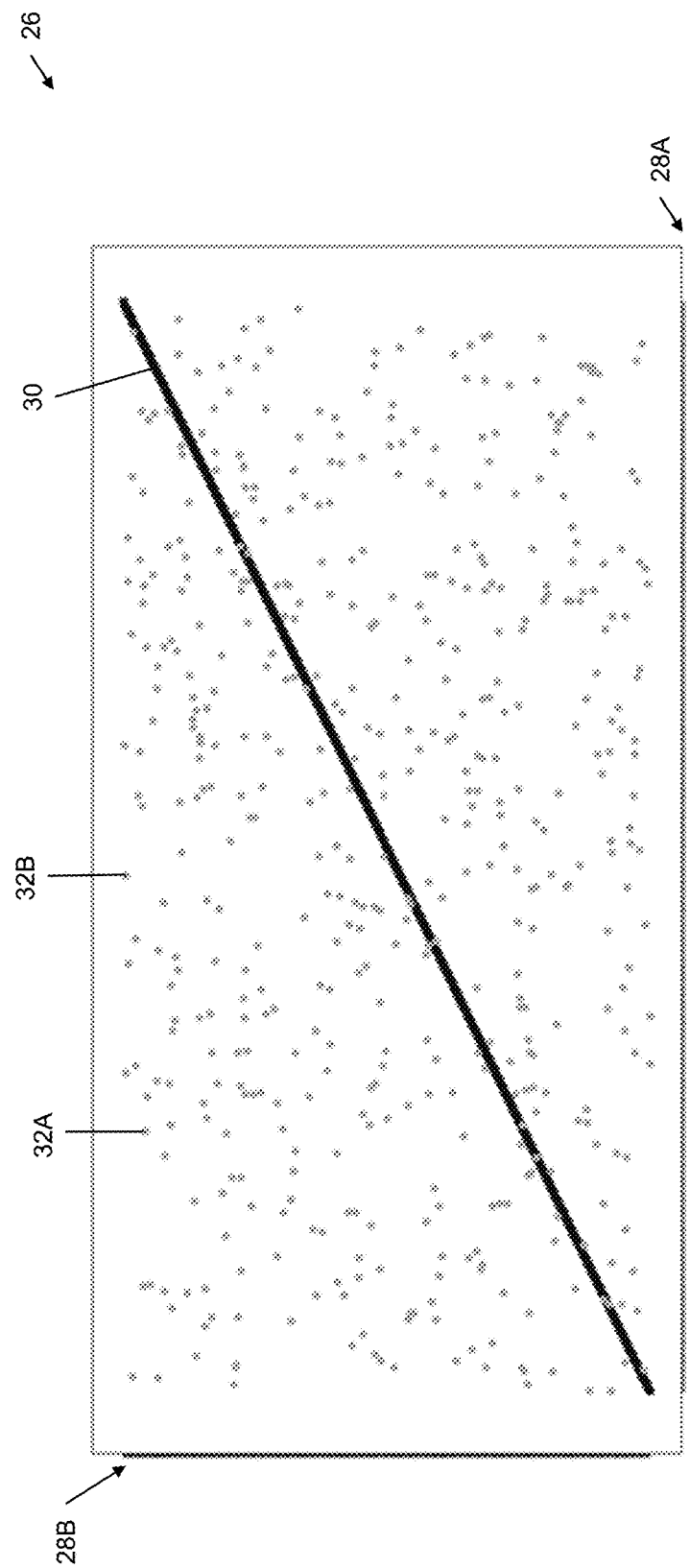
FIG. 6 is an example visualization of two datasets.

At block 502, a server device or system associated with or used by the testing tool 6 obtains a plurality of datapoints which define the dataset D1 comprising data to be anonymized. For example, dataset D1 can include logs which represent employee or customer interactions with the enterprise system 4. With reference to FIG. 6, the dataset can include two dimensions; an income of the individual, plotted along axis 28A in graph 26, and an address of the individual having the income, plotted along axis 28B. Graph 26 can therefore allow a third party (e.g., an adversary), to reverse engineer information about the individuals whose data comprise graph 26 if said third party has access to further information, such as publicly available information. For example, if the third party knows the names of the individuals whose data comprise graph 26, the third party can look up publicly available addresses associated with said individuals and approximate their incomes. In at least some example embodiments, the third party can directly reverse engineer information about the individuals whose data comprise graph 26. For example, where the third party knows that a particular individual's income, the third party can assume that axis 28B is alphabetical and determine a likely address associated with that individual.

At block 504, a server device or system associated with or used by the testing tool 6 obtains the dataset D2 comprising data resulting from the dataset D1 being subjected to an anonymization process by the testing platform 16 to anonymize at least a portion of the dataset D1. For example, the testing tool 6 can receive the anonymized data via the application 8.

At block 506, the server device associated with or used by the testing tool 6 generates a visual representation of the dataset D1. As shown in FIG. 6, the testing tool 6 can generate the line 30 consisting of datapoints in dataset D1.

In at least some example embodiments, the testing tool 6 assesses or determines a visual representation which is most appropriate for dataset D1. For example, the testing tool 6 can determine that dataset D1 includes spaced apart data, and that a bar chart includes increased potential for conveying information through visual representations compared to a scatterplot.

As will be described further herein, the testing tool 6 can generate the visual representation of dataset D1 based in part on an expected visual representation of the dataset D2, or an expected parameter of the expected visual representation of the dataset D2, to facilitate comparison. For example, the testing tool 6 can determine that dataset D2 includes data having a larger range (e.g., income values) relative to the dataset D1, and therefore the visual representation of a dataset D1 can include a range sufficient to allow for comparison of both datasets.

At block 508, the server device associated with or used by the testing tool 6 generates a visual representation of the dataset D2 (i.e., the scatter plot of points shown in FIG. 6, with points 32A, 32B shown as examples) the visual representation of dataset D2 reflecting at least in part a transformation from the dataset D1 to the dataset D2.

The transformation facilitates a comparison between the visual representation of D1 (e.g., line 30) and the visual representation of D2 (e.g., the points, including representative points 32A, 32B). For example, while in FIG. 6 it can be relatively easy to identify that dataset D1 and dataset D2 are sufficiently dissimilar to imply that anonymization has been successful, the task can be less straightforward in other instances discussed herein. For example, FIG. 7A shows a graph 34A with a visual representation 38A including a line 42 and one or more visual elements 40A indicating that the transformation of dataset D2 into dataset D1 (i.e., line 36A) was successful. The transformation performed by testing tool 6 can be a topological transformation which evaluates whether a continuous deformation of dataset D1 can achieve dataset D2 is possible.

For clarity, to generate the visual representation of dataset D2 reflecting at least in part the transformation, the testing tool 6 can generate one or more visual elements 40A (i.e., the arrows shown in FIG. 7A) to reflect the transformation or can visually represent the result of the dataset D2 being transformed by, for example plotting the resulting dataset D3 resulting from the transformation. As a result, a reviewer can assess the performance of the testing platform 16 more accurately with the aid of the visual representation of dataset D2, which highlights the differences between the datasets allowing the reviewer to observe the dataset D2 from a different perspective.

Figure 7B:
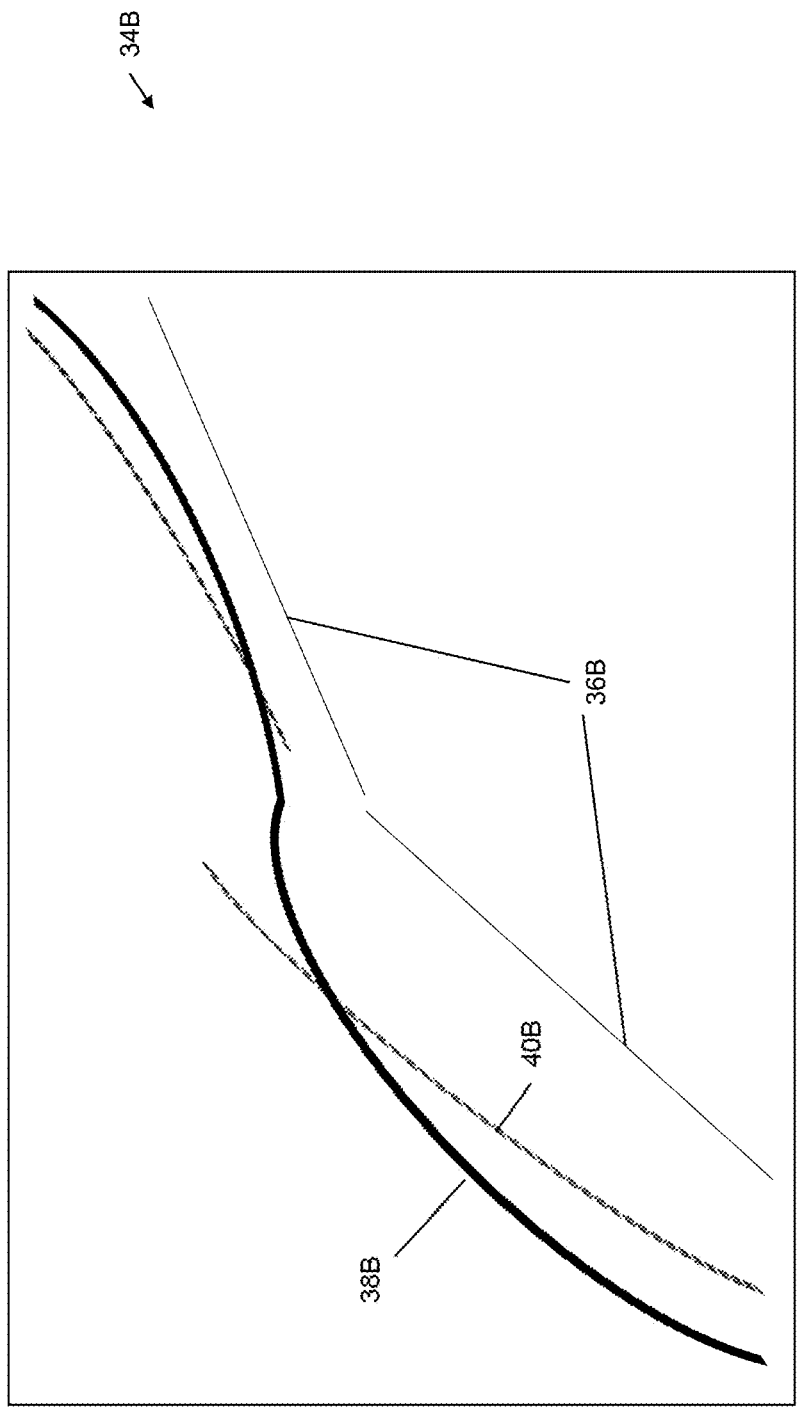
FIG. 7B is an example visualization of two additional further datasets.

In another non-limiting example embodiment, the transformations can be various shifts of the dataset D2. For example, the testing tool 6 can determine whether a shape associated with the data points of dataset D1 is sufficiently similar to the shape of the data points of dataset D2, and thereafter attempt various shifts (e.g., shift a line such as line 36A higher, lower, left, right, and so forth) to bring the two similar shapes together. Bringing the shapes closer together can facilitate easier visual comparison of dataset D1 and dataset D2. In another example, FIG. 7B shows a graph 34B with a line 36B of a dataset D1 (shown as having two distinct parts), a line 38B representing the dataset D2 received from a solution under examination, and a line 40B reflecting the result of a transformation of the line 38B (i.e., dataset D2). The transformation is affected by constructing a model which attempts to plot the datapoints of D2 into a candidate object (i.e., a box), and assesses whether the points, if a transformation equivalent to rotating said candidate object into another plane is applied, exhibit similarity to the data points of line 38B. In FIG. 7B, the visual representation of the transformation (i.e., line 40B) shows an alternative view of the line 38B to allow multifaceted assessment.

In example embodiments, the testing tool 6 can compare the dataset D2 to the dataset D1 by applying at least one threshold associated with the degree of similarity between the datasets. In response to determining that the dataset D2 fails the at least one threshold, the testing tool 6 can generate a warning. The at least one threshold can be based on whether the transformation was successfully performed on dataset D2. For example, where a topographical transformation exists to convert dataset D2 into dataset D1 (or vice versa), the dataset D2, and by extension the testing platform 16 can fail to meet the at least one threshold. In at least one example embodiment, the at least one threshold can be based on whether, after the transformation, dataset D1 and dataset D2 share a minimum set of data points. For example, the threshold can be failed where dataset D1 and dataset D2 share 20% or more data points. In at least some example embodiments, the criteria can be based on a regression of the dataset D2, as further described in relation to testing configuration module 6A.

At block 510, the testing tool 6 provides an output which includes a first visual representation in the second visual representation. In at least some example embodiments, the output overlaps or superimposes the first and second visual representations to facilitate comparison. The output can include the first and second visual representation side-by-side, the visual representations can be output such that each visual representation can be viewed individually.

Figure 8:
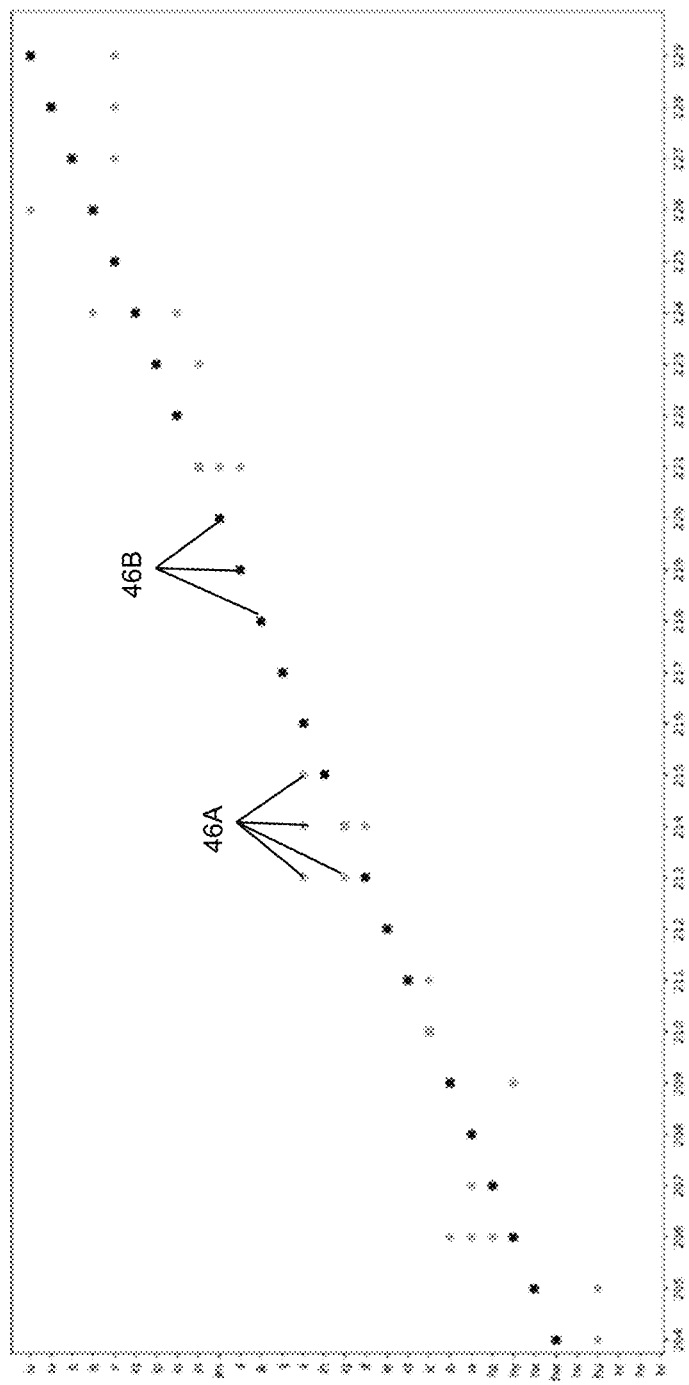
FIG. 8 is an example visualization of two additional datasets.

The output can permit selecting data points used to generate the visual representations of datasets D1, D2 to allow a reviewer to more closely inspect the similarity between dataset D1 and dataset D2. Referring now to FIG. 8, a reviewer can be able to select any of data points of dataset D1 (with illustrated data points 46A shown in FIG. 8), or any data points of dataset D2 (with illustrated data points 46B shown in FIG. 8). FIG. 8 further shows that the output can be configured to allow a reviewer to visually enlarge areas of interest of the visual representations.

Although the example discussed herein refer to two visual representations, the testing tool 6 can be configured to generate and output more than one visual representation of the dataset D2. For example, the testing tool 6 can generate a third visualization of the dataset D2 that is different from the visualization of D2 generated at first instance (e.g., one visualization reflects a first transformation, a shift of the shape defined by dataset D2, whereas the other visualization can indicate whether a topological transformation of dataset D2 into dataset D1 is possible). With multiple visualizations of the dataset D2, the degree of similarity between dataset D1 and dataset D2 can become more apparent when viewed by a reviewer. This can particularly be the case with data having multiple dimensions.

Moreover, although FIG. 5 is discussed in relation to a single testing platform 16, it is contemplated that multiple testing platforms 16 can be uniformly tested with this disclosure.

In an advantageous embodiment, the testing tool 6 generates the output for real-time analysis on data and anonymization processes implemented within a development environment (e.g., development environment 4C of FIG. 3).

The output facilitates a user reviewing the visual representations to determine whether the testing platform 16 sufficiently anonymizes sensitive data. In example embodiments, for example, such as embodiments where an enterprise is considering purchasing or implementing the testing platform 16, the reviewer of the visual representations of the output can determine (1) whether the testing platform 16 requires further testing, (2) whether the testing platform 16 performed poorly, (3) whether the testing platform 16 performed acceptably, and (4) whether the testing tool 6 should generate further visual representations or perform further evaluations. Where the testing platform 16 requires further testing, the testing tool 6 can select or generate a different dataset D1 to test the testing platform 16's performance with different types of data, or data which is more difficult to anonymize (e.g., require a decreased compression ratio), etc. Where the testing platform 16 failed, the testing tool 6 can store a log or prompt a reviewer to enter the reason for the failure for future evaluation purposes. Similarly, where the testing platform 16 succeeded, the testing tool 6 can store a log or prompt the reviewer to enter the condition under which the testing platform 16 succeeded. Where further evaluation can be performed by the testing tool 6, the testing tool 6 can be used to generate further visual representations or perform further evaluations of the dataset D2.

As set out in the examples above, the integration of the testing tool 6 promotes establishing clear delineations of responsibility and a speeding up of a workflow as a result of centralizing relevant information through integration. For example, the testing tool 6, as a result of the integration, can allow both qualitative and quantitative analysis of the solution provided by the testing platform 16. Moreover, the effectiveness of the testing tool 6 is greatly increased by the integration. The testing tool 6 is able to provide a platform for a reviewer to interact with the underlying data at differing degrees of depth, at different paces, and allows for retaining of knowledge about solutions thought the review process.

Referring now to FIG. 9, a flow diagram of a further method of assessing anonymization system quality is shown.

At block 902, similar to block 502, a dataset D1 comprising data to be anonymized is obtained. The dataset D1 can be data retrieved from the deployment environment 4C. Where dataset D1 is retrieved from the deployment environment 4C, the testing tool 6 can be used to compare the testing platform 16 to the existing procedures and deployment within the enterprise system 4. Comparing the testing platform 16 to the existing procedures and deployment can be advantageous in instances of a breach occurring within enterprise system 4.

At block 904, a request is transmitted to one or more testing platforms 16 for a dataset D2 to be generated from the dataset D1 undergoing anonymization processes according to one or more testing parameters. The testing parameters provided to each testing platform 16 can be different to allow for differential testing of the various testing platforms 16, or they can be the same. Similarly, the dataset D1 provided each testing platform 16 can be different to allow for differential testing of the various testing platforms 16, or it can be the same. For example, were a first testing system 16 utilizes a non-masking solution and a second testing system 16 utilizes a masking solution, the testing tool 6 can be configured to generate test parameters to facilitate comparison of the two different testing systems notwithstanding the different solution types employed by each test system.

At block 906, similar to block 506, a visual representation of the dataset D1 is generated.

At block 908, similar to block 508, the testing tool 6 generates visual representations of the datasets D2 received from the various testing platforms 16. The visual representations of the datasets D2 can reflect the same transformation applied to all received datasets D2, or different transformations can be applied to each dataset D2 received from the various testing systems 16.

At block 910, similar to block 510, an output including the visual representation of the dataset D1 and the visual representations of the datasets D2 is provided. In example embodiments, the output can be advantageously displayed by superimposing the first visual representation and the visual representations of the datasets D2 facilitating comparison between the different testing system 16 solutions.

In example embodiments where the dataset D1 includes data from the deployment environment 4C, the testing tool 6 can retrieve a further dataset D2 from the deployment environment 4C associated with the dataset D1 (referred to as the deployment data) and the output can further include a visual representation of the deployment data. In this way, testing tool 6 can facilitate comparing one or more candidate testing platforms 16 with the anonymization solution already implemented in the deployment data. In example embodiments, the testing tool 6 performs a comparison between the dataset(s) D2 received from the one or more candidate testing platforms 16 and the deployment data to identify any differences. For example, the testing tool 6 can determine a degree of similarity between the dataset D2 and the deployment data. The testing tool 6 can generate a visual representation associated with the comparison to facilitate a reviewer perceiving the comparison. For example, the comparison representation can include one or more visual elements as described herein to highlight notable findings of the comparison.

At block 912, the testing tool 6 determines whether further review of any of the solutions provided by the one or more testing platforms 16 is required. The testing tool 6 can determine that further review is required where one or more of the testing systems 16 provided datasets D2 that failed the threshold associated with a degree of similarity. In at least some example embodiments, the testing tool 6 determines that further review is required where a reviewer (e.g., an employee of the enterprise associated with the enterprise system 4) flags the provided solution as being inadequate or requiring further review.

In response to determining the existence of datasets D2 which fail the threshold associated with the degree of similarity, the testing tool 6 can generate a warning and include the warning in any output associated with the respective dataset D2. The warning can be visual, auditory, tactile (e.g., device 12 buzzing), and alerts the consumer of the output to the existence of the failed threshold.

Further review can constitute additional review by a more specialized, or sophisticated, reviewer. In example embodiments further review constitutes the testing tool 6 generating additional visual representations of the dataset D2, possibly reflecting further transformations. In at least some example embodiments, the further review constitutes testing the testing system 16 associated with the initial dataset D2 under review with further datasets D1.

Where a further review is not required, such as where a reviewer rejects or accepts the performance of the testing system 16 at first instance, the associated instance of testing tool 6 can be terminated or put the sleep, as shown in block 920B.

At block 914, where the testing tool 6 determines that further review is required, the testing tool 6 determines a second reviewer, and transmits and provides the relevant datasets and outputs the second reviewer. In example embodiments, the second reviewer is a further configuration of a testing tool 6 used to assess the solution provided by the testing platform 16.

Where the reviewer of first instance included annotations or notes, or other guidance to a subsequent reviewer, the testing tool 6 can provide any such information to the subsequent reviewer or alert the subsequent reviewer to the existence of the prior guidance.

Optionally, at block 916, the testing tool 6 can generate further visual representations or request further datasets (e.g., a dataset D2 based on a subset of the dataset D1) from the testing platform 16. This functionality can only be unlocked for the more sophisticated reviewers to (1) streamline the process of reviewing, and (2) reduce cost(s) associated with using or implementing the testing tool 6.

At block 918, the testing tool 6 receives input from the second reviewer as to whether the anonymization solution is acceptable based on the further review. The second reviewer make queue the testing platform 16 for deployment or can approve the provider of the testing platform 16 as a potential bidder for contracts with the enterprise system 4. Similar to block 920B, after the second reviewer's input, the instance of the testing tool 6 can be terminated.

Although FIG. 9 shows a method including two levels of review, it will be understood that the present disclosure contemplates various levels of review, performed by various reviewers.

Figure 10:
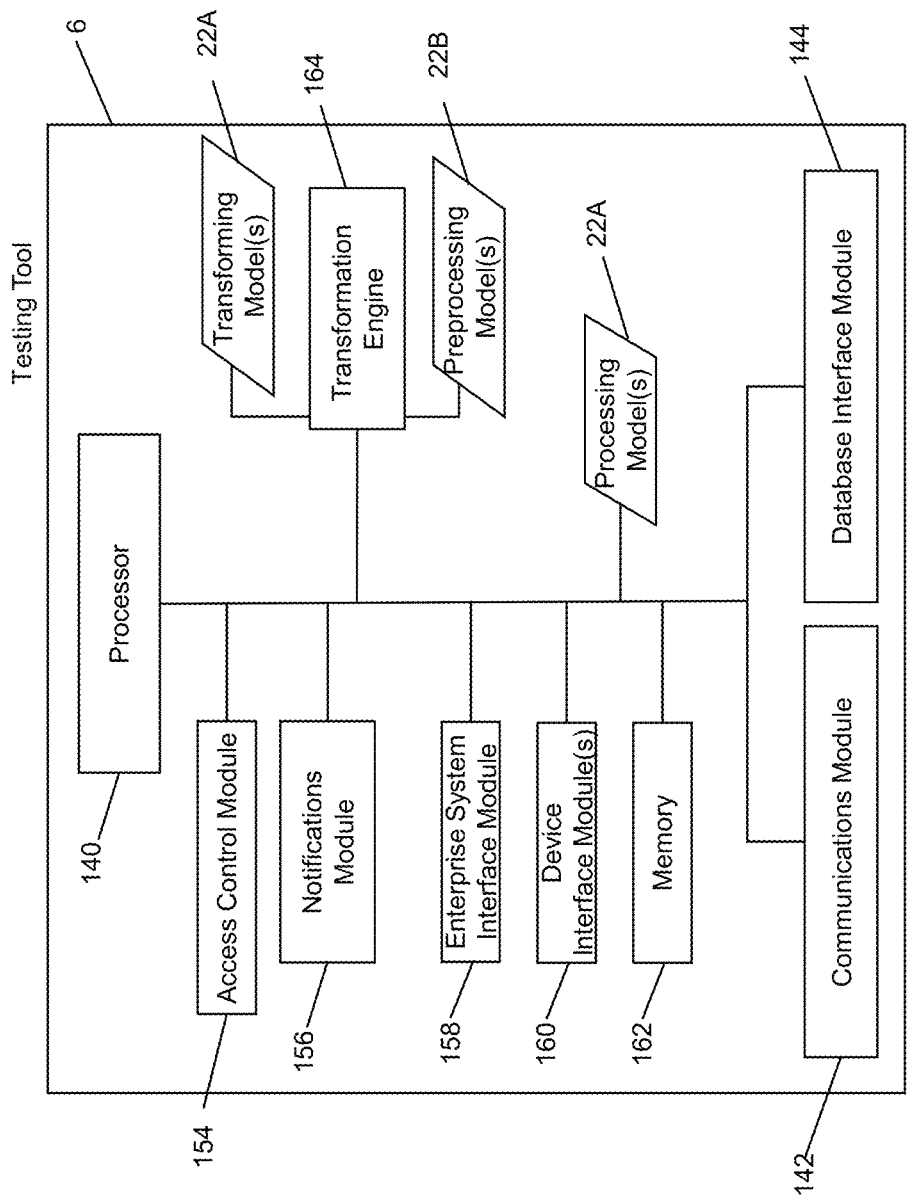
FIG. 10 is a block diagram of an example configuration of a testing tool.

In FIG. 10, an example configuration of the testing tool 6 is shown. In at least one embodiment, the testing tool 6 can include one or more processors 140, a communications module 142, and a database interface module 144 for interfacing with the databases (e.g., database 10), to retrieve, modify, and store (e.g., add) data. The testing tool 6 can be embodied as one or more server devices and/or other computing device(s) configured to operate within computing environment 2. Communications module 142 enables the testing tool 6 to communicate with one or more other components of the computing environment 2, such as device 12 (or one of its components), a server implementing application 8, etc., via a bus or other communication network 14. In FIG. 10, the testing tool 6 includes at least one memory or memory 162 that can include a tangible and non-transitory computer-readable medium having stored therein computer programs, sets of instructions, code, or data to be executed by processor 140. FIG. 10 illustrates examples of modules, tools and engines stored in memory on the testing tool 6 and operated by the processor 140. It can be appreciated that any of the modules, tools, and engines shown in FIG. 10 can also be hosted externally and be available to the testing tool 6, e.g., via the communications module 142.

In the example embodiment shown in FIG. 10, the testing tool 6 includes the transformation engine 164. The transformation engine 164 in this example includes the models 22B to generate dataset D1 and models 22B which are used to transform dataset D2. The models 22 can include various machine learning models or other pattern recognition routines. To this end, the transformation engine 164 can also include a training module (not shown) for training models from training data. The testing tool 6 also includes (a) an access control module 154 for interacting with or facilitating accessing databases, such as database 10, (b) a notifications module 156 for generating warnings, (c) an enterprise system interface module 158 for interacting with or facilitating communications with the enterprise system 4, and one or more device interface modules 160 for interacting with or facilitating communications with the device 12.

Figure 11:
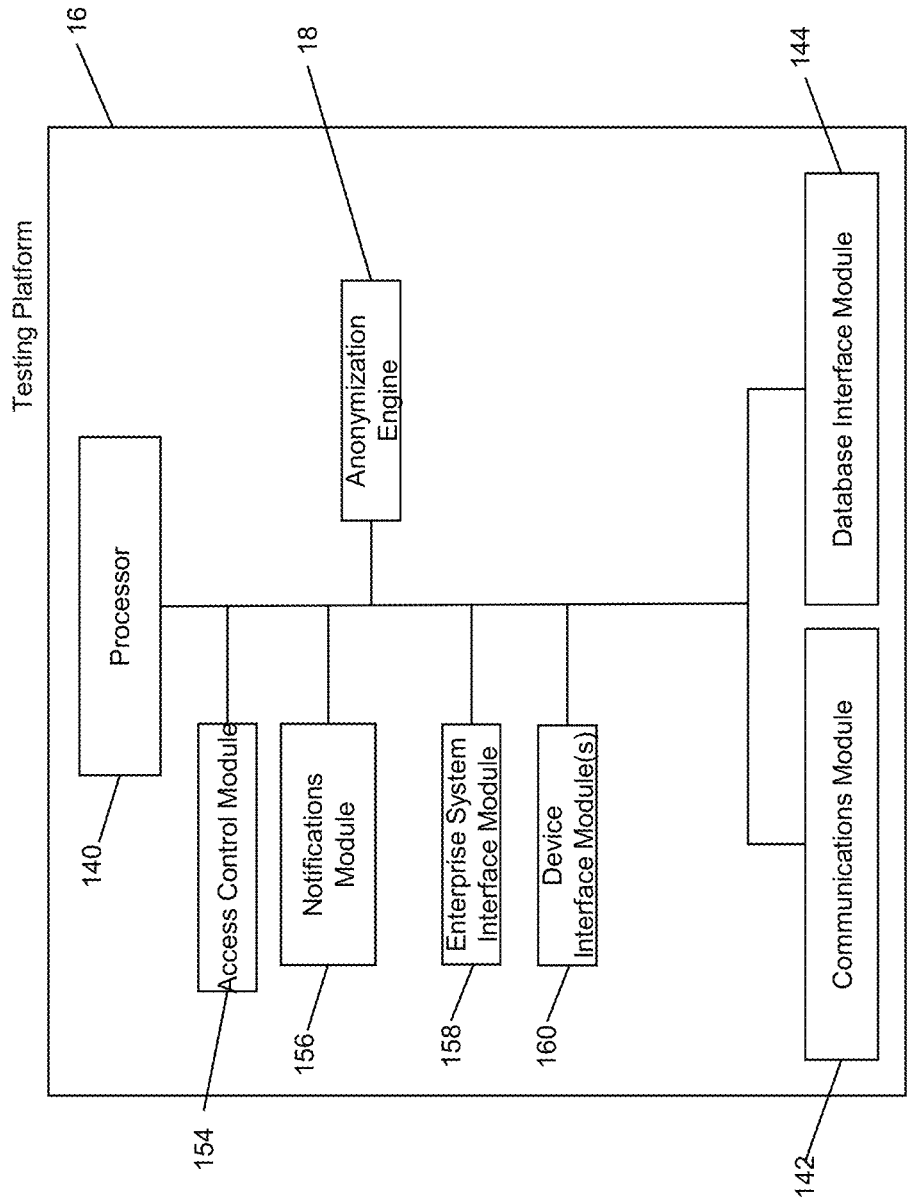
FIG. 11 is a block diagram of an example configuration of a testing platform.

In FIG. 11, an example configuration of the testing platform 16 is shown. Similar to the testing tool 6, the testing platform 16 includes a processor 140, a communications module 142, a database interface module 144, an access control module 154, a notifications module 156, an enterprise interface module 158, and a device interface module 160. The example testing platform 16 also includes the atomization engine 18.

Figure 12:
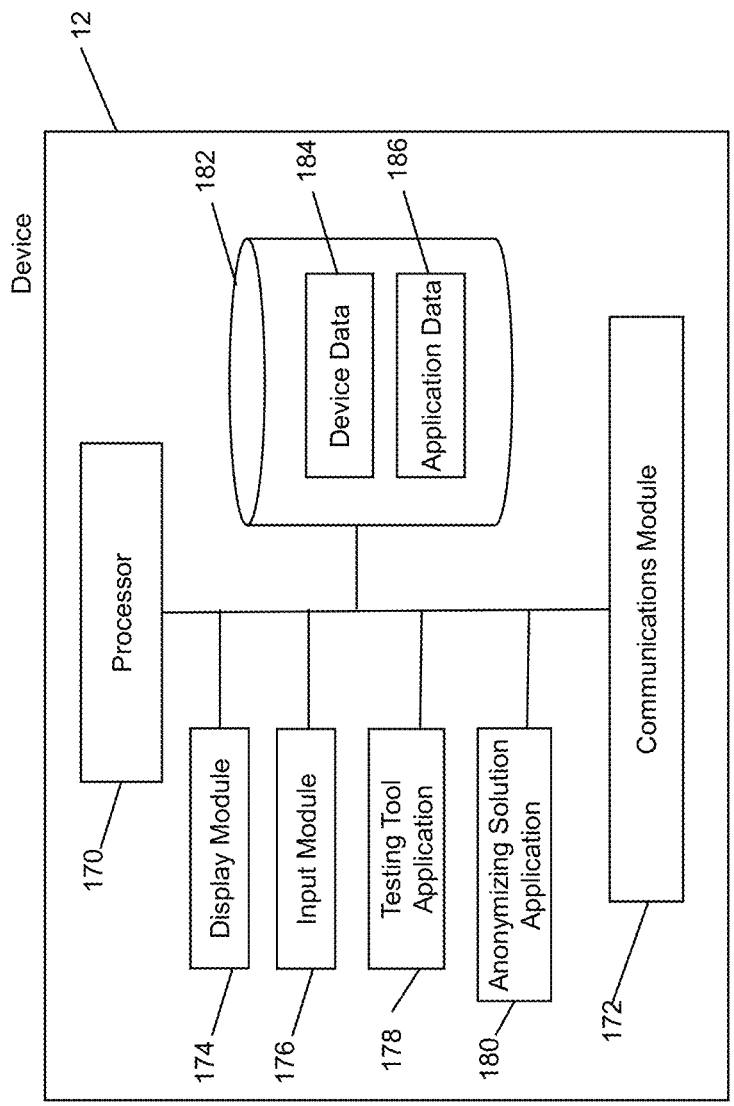
FIG. 12 is a block diagram of an example configuration of a computing device associated with a user, customer, or client.

In FIG. 12, an example configuration of the device 12 is shown. In certain embodiments, the device 12 can include one or more processors 170, a communications module 172, and a data store 182 storing device data 184 and application data 186. Communications module 172 enables the device 12 to communicate with one or more other components of the computing environment 2, such as testing platform 16 or enterprise system 4, via a bus or other communication network, such as the communication network 14. While not delineated in FIG. 12, the device 12 includes at least one memory or memory device that can include a tangible and non-transitory computer-readable medium having stored therein computer programs, sets of instructions, code, or data to be executed by processor 170. FIG. 12 illustrates examples of modules and applications stored in memory on the device 12 and operated by the processor 170. It can be appreciated that any of the modules and applications shown in FIG. 12 can also be hosted externally and be available to the device 12, e.g., via the communications module 172.

In the example embodiment shown in FIG. 12, the device 12 includes a display module 174 for rendering GUIs and other visual outputs on a display device such as a display screen, and an input module 176 for processing user or other inputs received at the device 12, e.g., via a touchscreen, input button, transceiver, microphone, keyboard, etc. As noted above, the device 12 can use such an input module 176 to gather inputs that are indicative of behavioral cues, facial recognition, presence detection, etc. The device 12 can include a testing tool application 178 for performing the operations described in association with the testing tool 6 herein. The device 12 in this example embodiment also includes an anonymizing solution application 180 for accessing the testing platform 16, e.g., via a mobile or traditional website. The data store 182 can be used to store device data 184, such as, but not limited to, an IP address or a MAC address that uniquely identifies device 12 within environment 8. The data store 182 can also be used to store application data 186, such as, but not limited to, login credentials, user preferences, cryptographic data (e.g., cryptographic keys), etc.

It will be appreciated that only certain modules, applications, tools, and engines are shown in FIGS. 10 to 12 for ease of illustration and various other components, or various combinations of components (e.g., the testing tool 6 can include a display module 174) would be provided and utilized by the testing tool 6, enterprise system 4, and device 12, as is known in the art.

It will also be appreciated that any module or component exemplified herein that executes instructions can include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in anomaly the testing tool 6, enterprise system 4, and device 12, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A testing tool for determining anonymization process quality, the testing tool comprising:
a processor;
a communications module coupled to the processor; and
a memory coupled to the processor, the memory storing computer executable instructions that when executed by the processor cause the processor to:
obtain, via the communications module, a first dataset comprising data to be anonymized;
obtain, via the communications module, a second dataset comprising data resulting from the first dataset being subjected to an anonymization process by a testing platform to anonymize at least a portion of the first dataset;
generate a first visual representation of the first dataset;
generate a second visual representation of the second dataset, the second visual representation reflecting at least in part a transformation of the data in the first dataset into the data of the second dataset; and
display an output including the first visual representation and the second visual representation at the same time with one or more visual elements generated to reflect the result of the transformation, to illustrate differences between datapoints in the first and second datasets as a result of the transformation, and indicate the quality of the anonymization process.

2. The testing tool of claim 1, wherein the transformation is a topological transformation.

3. The testing tool of claim 1, wherein the computer executable instructions further cause the processor to:
transmit to the testing platform, via the communications module, the first dataset and one or more testing parameters, the second dataset resulting from the first dataset being subjected to the anonymization process based on the one or more testing parameters by the testing platform.

4. The testing tool of claim 1, wherein the computer executable instructions further cause the processor to:
request, from a second testing platform, a third dataset generated by subjecting the first dataset to an anonymization process associated with the second testing platform;
generate a third visual representation based on the third dataset; and
wherein the output includes at least one of the third dataset and the third visual representation.

5. The testing tool of claim 4, wherein the testing tool requests the second dataset and the third dataset based on one or more testing parameters, or the testing tool requests the third dataset based on one or more additional testing parameters different from the one or more testing parameters.

6. The testing tool of claim 1, wherein the computer executable instructions further cause the processor to:
obtain the first dataset by retrieving the first dataset from a deployment environment;
obtain a fourth dataset from a deployment environment, the fourth dataset comprising at least a portion of anonymized data of the first dataset;
compare the second dataset to the fourth dataset retrieved from the deployment environment; and
generate a fourth visual representation associated with the comparison; and
wherein the output comprises the fourth visual representation.

7. The testing tool of claim 1, wherein the computer executable instructions further cause the processor to:
provide at least one of the second dataset, the first dataset or the output to a development environment, a testing environment, or both, for real time analysis.

8. The testing tool of claim 1, wherein the computer executable instructions further cause the processor to:
compare the second dataset to the first dataset by applying at least one threshold associated with a degree of similarity between datasets;
in response to determining the comparison fails the at least one threshold, generate a warning; and
wherein the output includes the warning.

9. The testing tool of claim 1, wherein the first visual representation represents a subset of the first dataset.

10. The testing tool of claim 1, wherein the computer executable instructions further cause the processor to:
generate a further visual representation of the second dataset different from the second visualization, the further visual representation reflecting at least in part a second transformation from the first dataset to the second dataset; and
wherein the output includes the further visual representation.

11. The testing tool of claim 1, wherein the computer executable instructions further cause the processor to:
receive input from a reviewer annotating the output; and
transmit the annotated output to a subsequent reviewer.

12. A method of determining anonymization system quality, the method executed by a device having a communications module and comprising:
obtaining, via the communications module, a first dataset comprising data to be anonymized;
obtaining, via the communications module, a second dataset comprising data resulting from the first dataset being subjected to an anonymization process by a testing platform to anonymize at least a portion of the first dataset;
generating a first visual representation of the first dataset;
generating a second visual representation of the second dataset, the second visual representation reflecting at least in part a transformation of the data in the first dataset into the data of the second dataset; and
displaying an output including the first visual representation and the second visual representation at the same time with one or more visual elements generated to reflect the result of the transformation, to illustrate differences between datapoints in the first and second datasets as a result of the transformation, and indicate the quality of the anonymization process.

13. The method of claim 12, wherein the transformation is a topological transformation.

14. The method of claim 12, further comprising:
transmitting to the testing platform, via the communications module, the first dataset and one or more testing parameters, the second dataset resulting from the first dataset being subjected to the anonymization process based on the one or more testing parameters by the testing platform.

15. The method of claim 12, further comprising:
requesting, from a second testing platform, a third dataset generated by subjecting the first dataset to an anonymization process associated with the second testing platform;
generating a third visual representation based on the third dataset; and
wherein the output includes at least one of the third dataset and the third visual representation.

16. The method of claim 12, further comprising:
comparing the second dataset to the first dataset by applying at least one threshold associated with a degree of similarity between datasets;
in response to determining the comparison fails the at least one threshold, generate a warning; and
wherein the output includes the warning.

17. The method of claim 12, wherein the first visual representation represents a subset of the first dataset.

18. The method of claim 12, further comprising:
generating a further visual representation of the second dataset different from the second visualization, the further visual representation reflecting at least in part a second transformation from the first dataset to the second dataset; and
wherein the output includes the further visual representation.

19. The method of claim 12, further comprising:
receiving input from a reviewer annotating the output; and
transmitting the annotated output to a subsequent reviewer.

20. A non-transitory computer readable medium for determining anonymization system quality, the computer readable medium comprising computer executable instructions for:
obtaining, via the communications module, a first dataset comprising data to be anonymized;
obtaining, via the communications module, a second dataset comprising data resulting from the first dataset being subjected to an anonymization process by a testing platform to anonymize at least a portion of the first dataset;
generating a first visual representation of the first dataset;

generating a second visual representation of the second dataset, the second visual representation reflecting at least in part a transformation of the data in the first dataset into the data of the second dataset; and displaying an output including the first visual representation and the second visual representation at the same time with one or more visual elements generated to reflect the result of the transformation, to illustrate differences between datapoints in the first and second datasets as a result of the transformation, and indicate the quality of the anonymization process.

\* \* \* \* \*